Aug. 25, 1942.     E. W. McKINLEY     2,294,314
STEM CONNECTION FOR FLUID PRESSURE REGULATORS
Original Filed Feb. 9, 1940
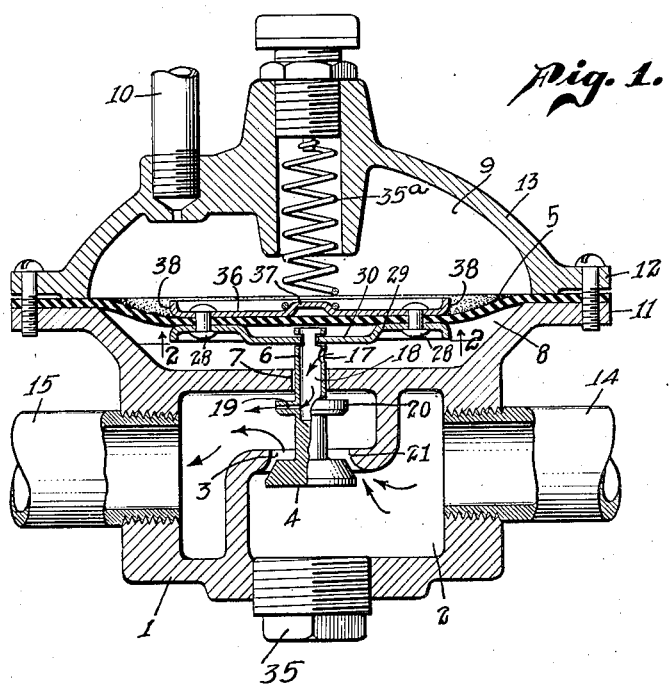
Fig. 1.
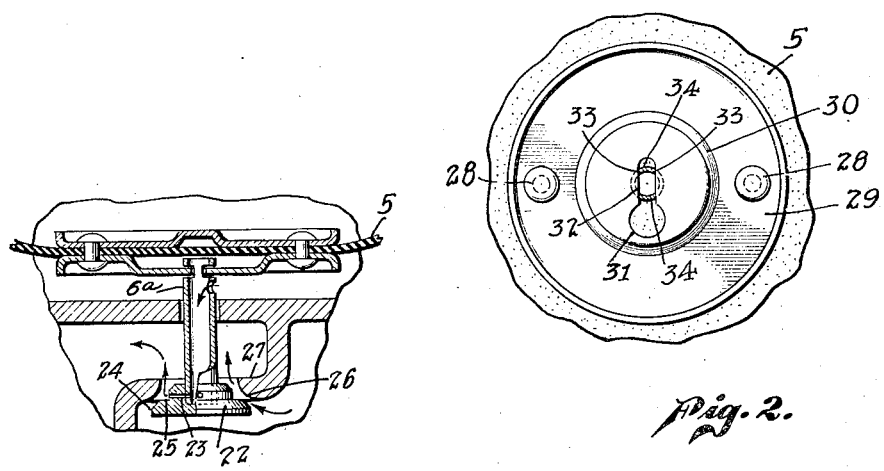
Fig. 2.
Fig. 3.
Inventor
EDWIN W. McKINLEY,
By Lyon & Lyon
Attorneys Patented Aug. 25, 1942

2,294,314

UNITED STATES PATENT OFFICE 2,294,314

STEM CONNECTION FOR FLUID PRESSURE REGULATORS

Edwin W. McKinley, Los Angeles, Calif.

Original application February 9, 1940, Serial No. 318,047. Divided and this application September 16, 1940, Serial No. 357,004

2 Claims. (Cl. 50—23)

The present application is a division of my pending application, Serial No. 318,047, filed February 9, 1940.

The present invention relates to fluid pressure control appliances, such as gas regulators. Regulators of this type are employed in service lines to maintain a substantially constant supply of gas to consumers under varying consumption by the consumer's gas burning appliances.

Such devices usually include a valve connected to a diaphragm in a pressure chamber, the pressure in which is controlled by the rate or volume of flow of gas passing through the device.

My invention relates to the construction of the connection of the valve stem to the diaphragm of the pressure chamber.

As usually constructed, if a stem such as that of a valve stem in gas regulators is to be attached to the diaphragm of the pressure-controlled chamber, the connection is effected by forming a hole in the diaphragm through which the end of the valve stem extends. Beyond the diaphragm the stem is threaded to receive a nut that clamps the diaphragm down against a shoulder or washer held fixed on the stem. In order to make a gas-tight connection with such construction, it is necessary to cover the threads of the stem with compositions popularly called "dope," the function of which is to prevent the gas from leaking through the hole and along the thread of the bolt. It has been my experience in the manufacture of regulators of this type, that approximately 20% of regulators having a connection of this kind, will commence to leak before the lapse of a long period of time, thereby necessitating the servicing of such regulators.

A principal object of this invention is to provide a simple construction for these parts, which enables the stem to be connected to the diaphragm in such a way that the movements of the diaphragm will control the position of the stem, and the valve carried thereby, but without necessitating passing the stem through the diaphragm.

The employment of the usual connection described above, involving the use of threads on the upper end of the stem, entails a relatively long machine operation in threading the stem, and the assembling of the parts using that type of connection, involving the necessity for the use of a composition on the thread, to prevent leakage, considerably raises the time element in assembling the parts.

One of the objects of this invention is to dispense with these operations and to provide a simple construction, which will be inexpensive to manufacture, but which will be substantially leak-proof, and at the same time, which can be readily assembled.

The valve employed in such a regulator, usually has a conical or substantially conical seat for the valve head. As ordinarily constructed, the diaphragm has a rigid connection to the valve stem, and this may interfere with the free movement of the valve head toward or from its seat. One of the objects of my invention is to provide a flexible connection between the diaphragm and the valve stem, that will permit any necessary freedom of movement of the valve head in centering itself as the valve moves in or out. Obviously, if such a valve is not properly centered, this would interfere with the accurate regulation of flow of the gas past the valve.

Further objects of the invention will appear hereinafter.

The invention consists in the novel parts and combination of parts to be described hereinafter, all of which contribute to produce an efficient stem connection for fluid pressure regulators.

A preferred embodiment of the invention is described in the following specification, while the broad scope of the invention is pointed out in the appended claims.

In the drawing:

Fig. 1 is a vertical section through a gas pressure regulator, and illustrating my invention applied to the same. This view shows the pipe connections partly in elevation and partly in section.

Fig. 2 is a horizontal section through the regulator taken about on the line 2—2 of Fig. 1, looking upwardly, to further illustrate the connection from the valve stem to the diaphragm. This view, however, omits the casing and represents the outer portion of the diaphragm as broken away.

Fig. 3 is a fragmentary vertical section through the valve and valve seat, certain parts being broken away, and illustrating the application of the improvement to another type of valve and stem.

The drawing illustrates a gas pressure regulator having a body 1 with a gas passage 2 through the same, passing through a valve port 3, the effective opening through which depends upon the position of a valve 4 which is controlled by a pressure diaphragm 5. The valve has a stem 6, the upper end of which is guided through an opening 7 so that the upper end of the stem projecting into the pressure chamber 8, can be connected to the diaphragm 5. As is usual in regulators of this type, the air chamber 9 above the diaphragm may be vented to the atmosphere, or in some cases to a chamber having any desired gas pressure. Such a connection can be made through a pipe 10 leading off from the chamber 9.

The diaphragm 5 is imperforate at its center, and is clamped between the flange 11 on the body 1 and the flange 12 of the dome-shaped bonnet or regulator cover 13.

The fluid or gas flows through the regulator in the direction indicated by the arrows, from the inlet pipe 14, and passes out through the delivery pipe 15. Such a regulator is usually provided with means whereby the velocity of flow of the gas determines the amount of pressure in the pressure chamber 8; and in the regulator illustrated, this is accomplished by providing the valve stem 6 with a duct 18 through which communication is established to the pressure chamber 8 below the diaphragm. For this purpose a tubular valve stem such as illustrated may be employed, the upper end of which may have a port 17 to establish communication to the pressure chamber 8.

The duct 18 communicates with the valve passage above the valve closure 4, at some point such that changes in the velocity of flow of the fluid through the valve will vary the eductive effect, and thereby affect the pressure in the pressure chamber 8.

A construction that utilizes the Venturi effect, is illustrated in Figure 3.

In the valve construction illustrated in Figure 1, the eduction effect in the connection from the valve passage to the pressure chamber is attained by providing a duct that emerges at the side of the valve toward the delivery end of the gas passage. In other words, an eduction port or passage 19 is provided that communicates at one end with the bore 16 of the tubular stem 6 and emerges at its other end toward the "down stream" side or delivery end of the valve passage 2. In the valve illustrated, a baffle 20 is provided in the form of a collar that projects out from the side of the stem 6, and the port or eduction passage 19 is located in this collar on the "down stream" side. With this construction, if an increased velocity of flow occurs for the fluid passing through the valve, an increased eduction effect will occur in the passage 19, which will withdraw some of the fluid in the pressure chamber 8, thereby occasioning a downward shifting of the movable control member of the regulator which, in the present instance, is the diaphragm 5.

The valve head or closure 4 is usually conical, and seats upon a conical or arcuate seat 21 surrounding the valve port 3.

In the construction illustrated in Fig. 3, that utilizes a Venturi effect, the construction of the upper portion of the valve stem 6a is substantially the same as that illustrated in Figure 1. The entire length of the valve stem, however, is tubular, and its lower end is secured in a valve head 22. This valve head is provided with one or more radial passages 23, the inner ends of which communicate with the bore of the valve stem 6a, and the outer ends of which emerge on the substantially conical side face 24 of the valve head. In the valve illustrated, these passages are all connected together by means of an annular groove 25 formed on the face of the valve. This groove is located at about the most constricted point of the effective valve opening which is indicated by the numeral 26, above which point the face 27 of the passage curves away from the conical face and enlarges the cross-section for the flow of the gas.

I employ an anti-leaking, and flexible connection for connecting the stem 6 to the diaphragm 5. This connection is made in a way to avoid passing the stem through the diaphragm.

Although it is possible to employ a cement or adhesive composition for this purpose, I prefer to employ rivets 28, but preferably only two such rivets are employed, disposed diametrically opposite to each other as illustrated in Figure 2. A socket plate 29 is provided, which, in the present instance is at the central part of the casing, and provided with a downwardly dished center or offset portion 30, and in this offset portion and removed from the central axis of the plate, I provide a small opening 31 sufficiently large to pass the upper end of the stem 6; and leading off laterally from the opening 31 toward the center of the plate, I provide a slot 32.

The upper end of the stem 6 is provided with two oppositely disposed cuts 33, leaving two narrow necks 34 in the wall of the tubular stem to pass into the slot, the cuts being slightly wider than the gauge or thickness of the plate. A tight fit is to be avoided so as to effect what is popularly called "a sloppy fit."

In assembling the parts of the regulator, the valve 4 is put in place after removing an access plug 35 at the bottom of the valve body 1; and the opening 31 is slipped over the upper end of the stem, and the diaphragm is then shifted laterally to move the slot 32 into the cuts 33 and against the necks 34. With this construction it will be evident that the rising and falling movements of the diaphragm will be imparted to the valve stem, but at the same time, by reason of the character of the connection between the stem and the diaphragm, considerable lost motion is established, permitting the stem 6 to be centered by the guide opening 7, so that it will hang vertically down; in other words, preventing any tendency of the diaphragm to cock the stem 6 out of its proper vertical position. This feature is of importance because it is the practice to provide ample clearance between the valve stem 6 and the guide opening 7.

In order to provide a seat for the usual coil spring 35a, and also to cooperate in forming a gas-tight connection at the rivets 28, I provide the regulator with a spring seat 36 in the form of a thin plate, which is preferably of the same light gauge as the plate 30. This plate 36 is preferably formed with an upwardly offset boss 37 of the proper diameter to engage the lower end of the coil spring and hold the same centered on the diaphragm.

In order to prevent the edges of the plates from cutting into the diaphragm when the same moves up or down, the margins of the two plates are bent away from the diaphragm in some manner to form curved cheeks 38 that may come more or less into contact with the diaphragm during these movements.

In practice, I have found that substantially no leakage occurs at the rivets 28. They are preferably of soft material, and when properly riveted, form a leak-tight connection at their heads, and also clamp the plates together with sufficient force to insure that no leakages can occur by gas passing between the faces of the diaphragm and the clamped faces of the plates.

It is obvious that the stem connection to the diaphragm described above, can be applied to a solid valve stem as readily as to the tubular type illustrated. In any case, the connection is a flexible one that affords some lost motion and prevents the diaphragm from tilting the valve stem out of its proper vertical position; and it also avoids the necessity for making a hole through the diaphragm where the stem connects to it. It will also be evident from Fig. 2, that the sides of the reduced neck or necks 34, prevent the stem from becoming oriented on its axis, thereby insuring that eduction ports in the valve leading into the gas passage, will maintain their intended direction and relation to the direction of flow of the gas passing through the gas passage of the valve. And although my improvement is described as applied to gas regulation, it is obvious that it could be used on any appliance for regulating flow of any fluid.

Many other embodiments of the invention may be resorted to without departing from the spirit of the invention.

What I claim is:

1. In a fluid pressure regulator, the combination of a casing having a fluid passage therethrough for the fluid, and having a pressure chamber with a wall separating the same from said passage, a diaphragm in the pressure chamber, a valve in said passage for controlling the flow through the same, a stem having a lost motion connection with the under side of the diaphragm, passing through said wall and connected to the valve closure, said stem terminating at the under side of the diaphragm and having a duct therethrough communicating with the pressure chamber and emerging into the fluid passage on the side of the valve toward which the fluid flows in passing through the same, said slot and said stem cooperating to prevent rotation of the stem relative to the valve opening.

2. In a gas appliance, the combination of a casing having a gas passage therethrough and a pressure chamber with a flexible diaphragm mounted therein, said flexible diaphragm being imperforate at its center, said casing having a valve-opening, a valve in the casing having a tubular stem the bore whereof communicates with the pressure chamber, said valve having a head cooperating with said valve-opening to regulate the flow of gas, a socket-plate in the form of a disc having its central portion dished and offset away from the diaphragm, rivets securing the outer portion of said socket-plate to the diaphragm beyond the edge of the dished portion, said dished portion having a stem-opening therethrough through which the end of the stem may be inserted by moving the same longitudinally into the stem-opening; and having a slot leading from said stem-opening to the central portion of the socket plate, said valve head having gas passages communicating with the interior of the tubular stem and emerging at said valve opening, said stem having a reduced neck adjacent the diaphragm forming an interlocking connection with the edges of said slot and having side faces maintaining the stem and valve head against orientation on the axis of the stem.

EDWIN W. McKINLEY.